(12) United States Patent
Hood et al.

(10) Patent No.: US 12,354,499 B2
(45) Date of Patent: Jul. 8, 2025

(54) AUTOMATED TUTORING SYSTEM AND METHOD

(71) Applicant: KTKSTS, LLC, Tulsa, OK (US)

(72) Inventors: Sean Richard Hood, Tulsa, OK (US); Sean Samuel Hood, Tulsa, OK (US); Benjamin Thomas Hood, Tulsa, OK (US)

( * ) Notice: Subject to any disclaimer, the term of this patent is extended or adjusted under 35 U.S.C. 154(b) by 1087 days.

(21) Appl. No.: 17/236,849

(22) Filed: Apr. 21, 2021

(65) Prior Publication Data

US 2022/0343786 A1     Oct. 27, 2022

(51) Int. Cl.
| | |
|---|---|
| G09B 5/14 | (2006.01) |
| G06F 16/9535 | (2019.01) |
| G06F 16/9536 | (2019.01) |
| G09B 5/06 | (2006.01) |

(52) U.S. Cl.
CPC ........... *G09B 5/14* (2013.01); *G06F 16/9535* (2019.01); *G06F 16/9536* (2019.01); *G09B 5/067* (2013.01)

(58) Field of Classification Search
CPC ....... G09B 5/14; G09B 5/067; G06F 16/9535; G06F 16/9536
See application file for complete search history.

(56) References Cited

U.S. PATENT DOCUMENTS

| | | |
|---|---|---|
| 6,014,134 A | 1/2000 | Bell et al. |
| 10,467,919 B2 | 11/2019 | Fuka |
| 2002/0013836 A1 | 1/2002 | Friedman et al. |
| 2004/0043363 A1 | 3/2004 | Dorner et al. |
| 2009/0298039 A1 | 12/2009 | Glazier |
| 2012/0264099 A1 | 10/2012 | Craft, IV |
| 2018/0301048 A1 | 10/2018 | Almassizadeh |
| 2020/0074408 A1 | 3/2020 | Binder et al. |
| 2020/0320893 A1 | 10/2020 | Bates et al. |
| 2020/0410455 A1 | 12/2020 | Avino et al. |

*Primary Examiner* — Kesha Frisby
(74) *Attorney, Agent, or Firm* — D. Ward Hobson

(57) ABSTRACT

An automated tutoring platform, system and method configured to permit students to find and contact, in real time, other students or persons with subject matter expertise in a particular area and to directly connect with such persons to purchase and obtain tutoring services online through the automated tutoring system and method. The automated tutoring system and method is configured to provide an on-line or virtual marketplace or exchange where students can interact, discuss topics of interest, send and receive messages, find qualified and pre-vetted subject matter experts, students or other persons with relevant experience for a tutoring session or sessions and to receive such tutoring sessions virtually through the automated tutoring platform, system and method.

14 Claims, 10 Drawing Sheets

HOME SCREEN

STUDENT SCREEN

TUTOR SCREEN

CLASSROOM SCREEN

DROP DOWN MENUS

SUBJECT MATTER

SUBJECT MATTER

GRADE LEVEL

GRADE LEVEL

MATH

SUBJECT MATTER

SCIENCE

SUBJECT MATTER

| SCIENCE |
|---|
| BIOLOGY I<br>BIOLOGY II<br>CHEMISTRY<br>PHYSICS |

ENGLISH

SUBJECT MATTER

| ENGLISH |
|---|
| GRAMMAR<br>ENGLISH<br>LITERATURE<br>WRITING / SPEECH |

HISTORY

SUBJECT MATTER

| HISTORY |
|---|
| WORLD HISTORY<br>AMERICAN HISTORY<br>EUROPEAN HISTORY |

SOCIAL STUDIES

SUBJECT MATTER

TOOLBOX

SUBJECT MATTER

LEGEND

LEGEND
___

SUBJECT MATTER      TOOLBOX

GRADE LEVEL      HOME

POST TO CHALKBOARD      CAMERA

MICROPHONE

AUTOMATED TUTORING SYSTEM AND METHOD

BACKGROUND

Traditional tutoring software systems and methods are generally configured to deliver one or more type of curriculum to a student and to provide pre-set feedback and guidance to assist a student learn and master the delivered curriculum. Generally, these traditional tutoring software systems and methods provide the student with feedback and guidance either through automated features in the tutoring software program itself or by means of a live tutor such as an instructor associated with the software provider who has been trained on the software and the curriculum and who can be available to answer questions or assist the student as needed via telephone, email or the like.

Unfortunately, however, these traditional tutoring software systems and methods are often expensive, cumbersome, limited to a specific type of curriculum, and require the software provider to retain or hire a variety of subject matter experts. Such traditional tutoring software systems and methods are often of limited real-world help when a student attempts to complete an unrelated task or project that has been assigned by a teacher, professor, or other person not affiliated or associated with the traditional tutoring software system and method. Often, students quickly abandon such traditional tutoring software systems and methods and directly contact other students whom they know and trust who are currently studying or who have recently completed the same subject matter for more specific and relevant tutoring services. For example, a freshman in college may contact a sophomore at the same college for tutoring in a class that the sophomore has previously completed. However, students often have difficulty finding relevant student tutors, prices for tutoring services may vary dramatically, and the reliability, safety or usefulness of the tutor may be unknown or unreliable. Tutoring transactions may also be complicated by the payment arrangements between the student and tutor and the need for such tutoring to be completed virtually without the requirement for in person, face to face, interactions for example. Traditional tutoring software systems and methods do not solve these and other problems and do not provide an online or virtual marketplace for reliable tutoring services where students can connect directly with other students or subject matter experts in real-time to obtain or purchase the desired tutoring services.

To that end it would be advantageous to provide an improved automated tutoring platform, system and method that is configured to permit students to find and contact online, in real time, other students or persons with subject matter expertise in a particular area, and to directly connect with such persons online to obtain tutoring services through the improved automated tutoring platform, system and method. The improved automated tutoring platform, system and method is configured to provide an on-line or virtual marketplace or exchange where students can interact, discuss topics of interest, send and receive messages, find qualified and pre-vetted subject matter experts, students or other persons with relevant experience for a tutoring session or sessions and to receive such tutoring sessions virtually all through the improved automated tutoring platform, system and method.

It is to such an improved online automated tutoring platform and system and to methods of using thereof that exemplary embodiments of the inventive concepts disclosed and claimed herein are directed.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Figure 1:
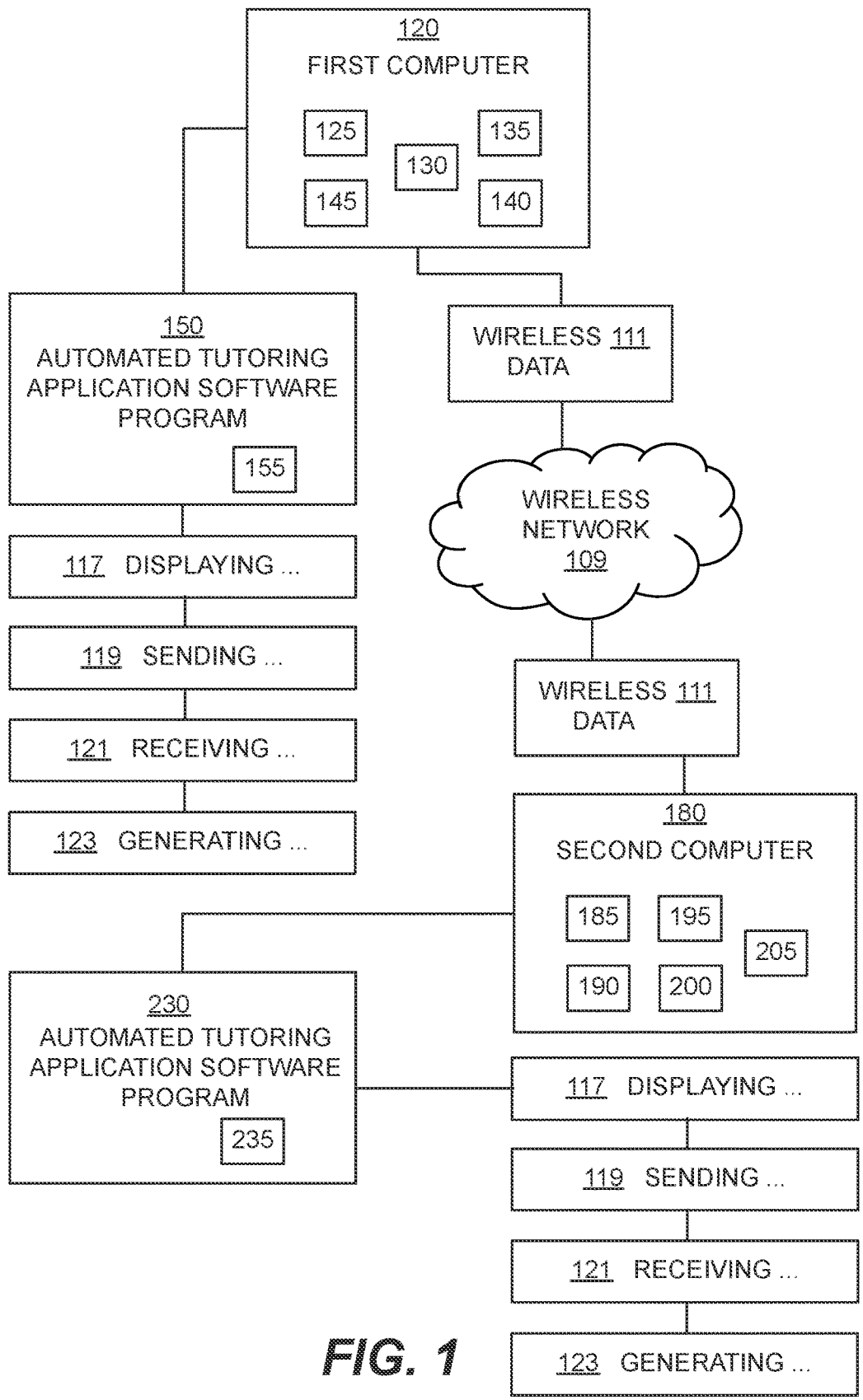
FIG. 1 is a diagram of an embodiment of an automated tutoring system (100) according to the inventive concepts disclosed herein.

Before explaining at least one embodiment of the inventive concepts disclosed herein in detail, it is to be understood that the inventive concepts are not limited in their application to the details of construction and the arrangements of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

As used herein, the terms "comprises," "comprising," "includes," "including," "has," "having," or any other variation thereof, are intended to cover a non-exclusive inclusion. For example, a system, process, method, article, or apparatus that comprises a list of elements is not necessarily limited to only those elements but may include other elements not expressly listed.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to FIGS. 1-18, shown therein are embodiments of the automated tutoring platform, system and method. The automated tutoring platform, system and method is generally directed to systems and steps for one or more interconnected computers running one or more software programs that are configured to permit students to find and connect with tutors, in real time, and to virtually set up, pay for and conduct one or more tutoring sessions through the one or more software programs running on the one or more computers. For example, in some embodiments, the tutoring session may be held virtually through the automated tutoring application software program via one or more computers, including mobile devices, such as smart phones, tablets and the like, having video cameras and microphones, for example. The tutoring services may be provided by video conferencing, messaging and screen sharing functions on a mobile phone application and/or computer, website or one or more software applications between the student and the tutor that permit the student and the tutor to simultaneously view documents and materials and communicate and to work together on real-world assignments and projects, in real time.

In some embodiments, for example, a person desiring to be listed as a tutor or a student on the automated tutoring platform, system and method must complete an application and register and set up a user profile via the automated tutoring platform, system and method to be able to receive or offer tutoring services through the online automated tutoring platform, system and method. In this way, both the student and tutor will have assurances that any person offering or receiving tutoring services via the automated tutoring platform, system and method has meet certain basic requirements related to safety, reliability and payment.

For example, in some embodiments, the improved automated tutoring platform, system and method is configured to allow a student in need of help in a particular subject to "post" a question on a virtual "chalkboard" page of the automated tutoring software application program of the automated tutoring platform, system and method. Once a question has been posted to the virtual chalkboard, an automatic notification may be sent out to all registered tutors who have expertise in that subject matter. A tutor may then view the post and decide if the tutor is able and willing to help. If the tutor believes that he or she can help the student, the tutor may "accept" the notification. Once accepted, the improved automated tutoring platform, system and method directs the tutor and student to enter a virtual and private "classroom", which may be a private chat room for one student and one tutor, or a group of students or tutors, to interact directly, via messaging, video, chat, exchanging of pictures and to work through the particular posted problem virtually and in real time through the automated tutoring platform, system and method.

In some embodiments, for example, a person may set up a profile as a student, tutor, or both. A user of the automated tutoring platform, system and method may be required to list and identify the subject matters of interest or such subject matters that they have expertise, skill, or knowledge. For example, a tutor may select from a menu of subject matter areas they wish to provide tutoring services without limiting the number of subject matter areas. In some embodiments, the tutor or student username is publicly shared, while in other embodiments the student or tutor username may be private or only selectively shared or publicly available. In some embodiments, the student and tutor profile may remain confidential and not shared, while in other embodiments the student or tutor profile may be shared or publicly available or portions of the student or tutor profile may be selectively shared or publicly available. When a student "posts" a question to a "chalkboard" via the improved automated tutoring platform, system and method, the student may select from a list of subjects that their posted question pertains to. For example, math, English, history, and the like.

Persons who have registered and set up a profile as a tutor for that subject matter will then be able to receive one or more notifications that a question has been posted in that subject area. The tutor will then be able to view the question posted and determine if they have the ability and time to help the student with the posted question. A tutor, through the improved automated tutoring platform, system and method may establish a schedule when they are available to receive such notifications. For example, a tutor may select to receive posting notifications automatically, 24 hours a day, or during a select time frame, for example from 5 pm until 9 pm Monday through Friday. A tutor may also select to not receive notifications of postings during a select date and time range or at recurring times over a select date and time range, by selecting an "unavailable" button for a desired time or time frame or date or date range.

In some embodiments, for example, a student may search for tutors from a list of approved tutors on the improved automated tutoring platform by subject matter, availability, location, and various other criteria. There are no limits as to the location and availability of either the student or tutor. For example, a student located in Oklahoma USA may receive tutoring services from a tutor located in California USA or a tutor located in Paris France, for example. In some embodiments, the improved automated tutoring platform, system and method may also include a translation feature or button that permits students and tutors, who speak different languages to interact and translate text, voice and other communications in real-time through the improved automated tutoring platform, system and method. Information provided by a user during the initial registration and profile set up process, such as geographic location (either as stated in the registration application or profile, or via real-time GPS coordinates form a computer such as a mobile smart phone), language spoken, and various other criteria may be prioritized when sending out notifications to tutors. For example, an initial geographic range near the student may be selected so that a posting may be first sent out only to tutors within that initial geographic range near the student. Likewise, after a short period of time, if the posting is not accepted by a tutor, the posting range may then be automatically sent out to a second geographic range that includes locations further from the location of the student, for example. In this way, tutors that are in substantially close proximity to the student may be selected to be notified first of postings. For example, a geographic range of tutors available in a particular city, then state, then geographic region, then country, then worldwide, for example.

In some embodiments, for example, when a student posts a question or problem to the chalkboard, the student will open the application and select the "post" icon, select the subject matter, from a drop-down menu, then select the grade level equivalent of the subject, type their question, or take a picture of the question from their book or worksheet, or copy and paste the question from an online source and then post the question. Then, the automated tutoring application, using the information provided by the student as to the subject matter and grade level, will send a notification to the tutors who have registered for that subject matter and grade level. Once a tutor has viewed the posting and accepted the notification, the student and tutor will be connected in real-time to one another in a private virtual chat room called a "classroom." Once inside of the virtual classroom, the student and tutor may have a variety of tools available for use from a drop-down. The tools will include, but not be limited to, such applications as a calculator, translator, equation writer and various other tools and links to help facilitate communication and problem solving in real-time via the automated tutoring platform, system and method. The application may keep track of the time involved in a tutoring session via a "timesheet" or have an automatic time recording application, configured to automatically record and track the length of time the student and tutor are in the virtual classroom. The time recording application, may be configured to keep a record of the running total time the tutor has been helping the student and may be stopped and started, for example, by the tutor depending upon the nature of the tutoring session and intended use of the timer.

In some embodiments, for example, the improved online automated tutoring platform, system and method also permits users to purchase and pay for tutoring services and to rate tutors, based on skill-level, quality of tutoring services, price, availability and various other criteria. Such rating system may be available for students to view prior to making decisions to select a tutor or purchase tutoring services from a selected tutor. Such ratings and reviews may help students and tutors set and negotiate rates for services and find and select tutors that will be reliable and helpful for students in a particular field of study or with a particular assignment. For example, at the end of each tutoring session, the student may rate the tutoring session, by ranking the tutor and providing the tutor with a ranking, from between one to five stars, for example, one star being a bad rating and five stars being a good rating. The rating system provides several benefits to both the student and the tutor. For example, the rating system helps both students and tutors provide and receive better tutoring services and provides a tutor with experience helpful for college or other academic admissions or job applications, or community service or volunteer activities, for example.

In some embodiments, a student and tutor may agree on a price for the tutoring services and purchase such tutoring services. For example, a student may select a desired tutor, purchase, negotiate and/or bid on a tutoring session or sessions with the desired tutor, at a desired rate or at a desired date and time. Students may also elect to purchase such tutoring services from a selected tutor at a specified price or bid on such tutoring services through an online auction process provided through the improved online automated tutoring platform, system and method by paying a transaction fee for each bid. In the auction process, if a selected tutor is in high demand, a tutor may be able to secure a higher rate through the auction process than the tutor's standard rate. Likewise, if the tutor is not in high demand, a student may be able to secure a tutoring session at a lower rate. In this way a virtual marketplace for tutoring services is created that provides incentives for both students and tutors to provide tutoring services and receive reliable tutoring services in real-time and at fair rates.

Further, in some embodiments, for example, the student and the tutor may select and pay for one tutoring transaction or they may select and pay for multiple or recurring tutoring sessions. The rate set by a Tutor may be negotiated, increased or decreased based upon demand, market rate for such services and whether the student is purchasing multiple tutoring sessions or just one tutoring session. In this way, the tutor and student can negotiate and agree upon transaction terms based upon the existing market for tutoring services available on the automated tutoring platform, system and method.

Further, in some embodiments, for example, once a tutoring transaction has been selected and confirmed, the payment may be processed directly through the improved online automated tutoring platform, system and method.

Alternatively, payment may be made through the improved online automated tutoring platform, system and method through a third-party payment provider. This enables both the student and the tutor to receive real-time confirmation that a tutoring session has been selected, a price has been agreed upon, and payment has been made. After payment has been confirmed, both the student and the tutor will receive from the online automated tutoring platform, system and method a website link or other access point or login information so that the tutoring session can be completed virtually through the online automated tutoring platform, system and method at the selected date and time.

In some embodiments, for example, the automated tutoring platform, system and method may be configured to send automated reports containing information regarding a completed tutoring session and other information to one or more email addresses or telephone phone numbers via text-message. For example, a student or parent of a student, may set up a student profile that permits the automated tutoring platform, system and method to automatically sends reports to the student or parent email or telephone regarding, for example, whether the tutoring session was held, the time and duration of the session and a summary of materials covered and/or subject matter areas that need attention or correction. The report may be automatically generated or may be selectively generated by means of a survey or test performed by the student at the beginning or end of the tutoring session which prompts the student or tutor to input certain data regarding the tutoring session for example. The data that is input by the student or tutor either upon setting up an initial profile or at the beginning or end of a tutoring session, may then be output into a variety of report formats for delivery to pre-selected emails or telephone numbers and at pre-selected dates and times. In this way a student or parent of a student may get automatic updates via email or text message tracking the students' progress and identifying areas in need of improvement for example. The report format may be customized during the initial set up process depending upon a variety of criteria so that the report generated is custom to each student or tutor and designed to provide only relevant information as determined by the student, tutor, or the parent of the student, for example. Similarly, the student profile and tutor profile may be set up to selectively permit reports to be generated to the tutor of the student so that the tutor can also track and record the progress a student makes and direct course material or direct the next tutoring session to more specific content focused on areas in need of improvement.

In some embodiments, for example, the improved online automated tutoring platform, system and method is configured to be monetized through selling advertising on the improved online automated tutoring platform. Likewise, in some embodiments, the improved online automated tutoring platform, system and method may be monetized through the payment of a transaction fee or charge associated with each paid transaction or each auction bid processed through the improved online automated tutoring platform, system or method or via a third-party payment provider, for example. Likewise, in some embodiments, the improved online automated tutoring platform, system and method is configured be offered to users via a subscription fee or via various other payment terms, for example.

For example, in some embodiments, the online automated tutoring platform, system and method may be monetized through selling advertisements that are displayed in the form of a "banner" displayed on the bottom, top or sides of the viewing screen of the application, for example. The banner may periodically scroll so that a variety of advertisements may be continuously displayed on one or more of the applications viewing screens, for example. Further, in some embodiments, when a tutor provides services to a student, payment may be made in the form of a "credit" or "credits" which may be selectively applied toward the purchase of goods listed for sale on an online virtual store that is a part of the online automated tutoring platform, system and method. For example, a tutor may earn five hundred points or credits from one or more tutoring sessions and then be able to use or redeem those credits or points to purchase a variety of goods that are available for purchase using the credits or points through the online automated tutoring platform, system and method.

Referring now to FIG. 1, shown therein is an embodiment of an automated tutoring system (100). As shown therein, the automated tutoring system (100) includes a first computer (120) having a display screen (125), a video camera (130), one or more processors (135), one or more transceivers (140) for transmitting and receiving wireless data (111) and one or more data storage devices (145). The automated tutoring system (100) includes automated tutoring application software program (150) running on the first computer (120). The automated tutoring application software program (150) including automated application program instructions (155) for: displaying (117) a posted tutoring query from a student; sending (119) one or more automatic notification to one or more computer associated with one or more pre-approved tutor containing information about the posted tutoring query; receiving (121) a notification from a computer associated with a pre-approved tutor that a pre-approved tutor has accepted the notification; and generating (123) a private virtual classroom for real-time communication between the computer associated with the pre-approved tutor that accepted the notification and the computer associated with the student. The automated tutoring system (100) further includes a second computer (180) connected to the first computer (120) through a wireless network (109), the second computer (180) comprising a display screen (185), a video camera (190), one or more processors (195), one or more transceivers (200) for transmitting and receiving wireless data (111) and one or more data storage devices (205). The automated tutoring system (100) further includes an automated tutoring application software program (230) running on the second computer (180). The automated tutoring application software program (230) includes automated application program instructions (235) for: displaying (117) a posted tutoring query from a student; sending (119) one or more automatic notification to one or more computer associated with one or more pre-approved tutor containing information about the posted tutoring query; receiving (121) a notification from a computer associated with a pre-approved tutor that a pre-approved tutor has accepted the notification; and generating (123) a private virtual classroom for real-time communication between the computer associated with the pre-approved tutor that accepted the notification and the computer associated with the student.

Figure 2:
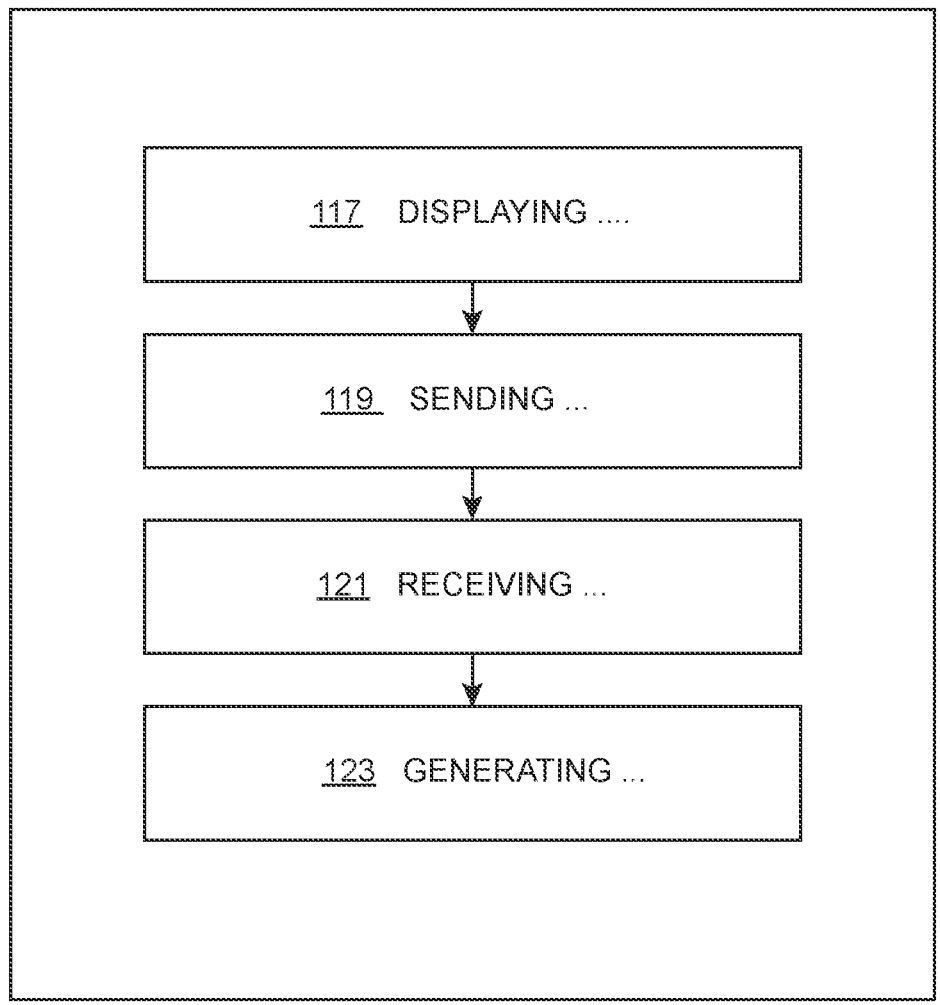
FIG. 2 is a diagram of an embodiment of an automated tutoring method (400) according to the inventive concepts disclosed herein.

Referring now to FIG. 2, shown therein is an embodiment of an automated tutoring method (400) in a computer. As shown therein, the automated tutoring method (400) includes the steps of: displaying (117) a posted tutoring query from a student; sending (119) one or more automatic notification to one or more computer associated with one or more pre-approved tutor containing information about the posted tutoring query; receiving (121) a notification from a computer associated with a pre-approved tutor that a pre-approved tutor has accepted the notification; and generating (123) a private virtual classroom for real-time communication between the computer associated with the pre-approved tutor that accepted the notification and the computer associated with the student.

In some embodiments, the method (400) further includes the steps of: generating a tutoring report, the tutoring report based upon real-time data from one or more tutoring session and saved data; and sending the generated tutoring report to one or more specified email address or telephone number.

Figure 3:
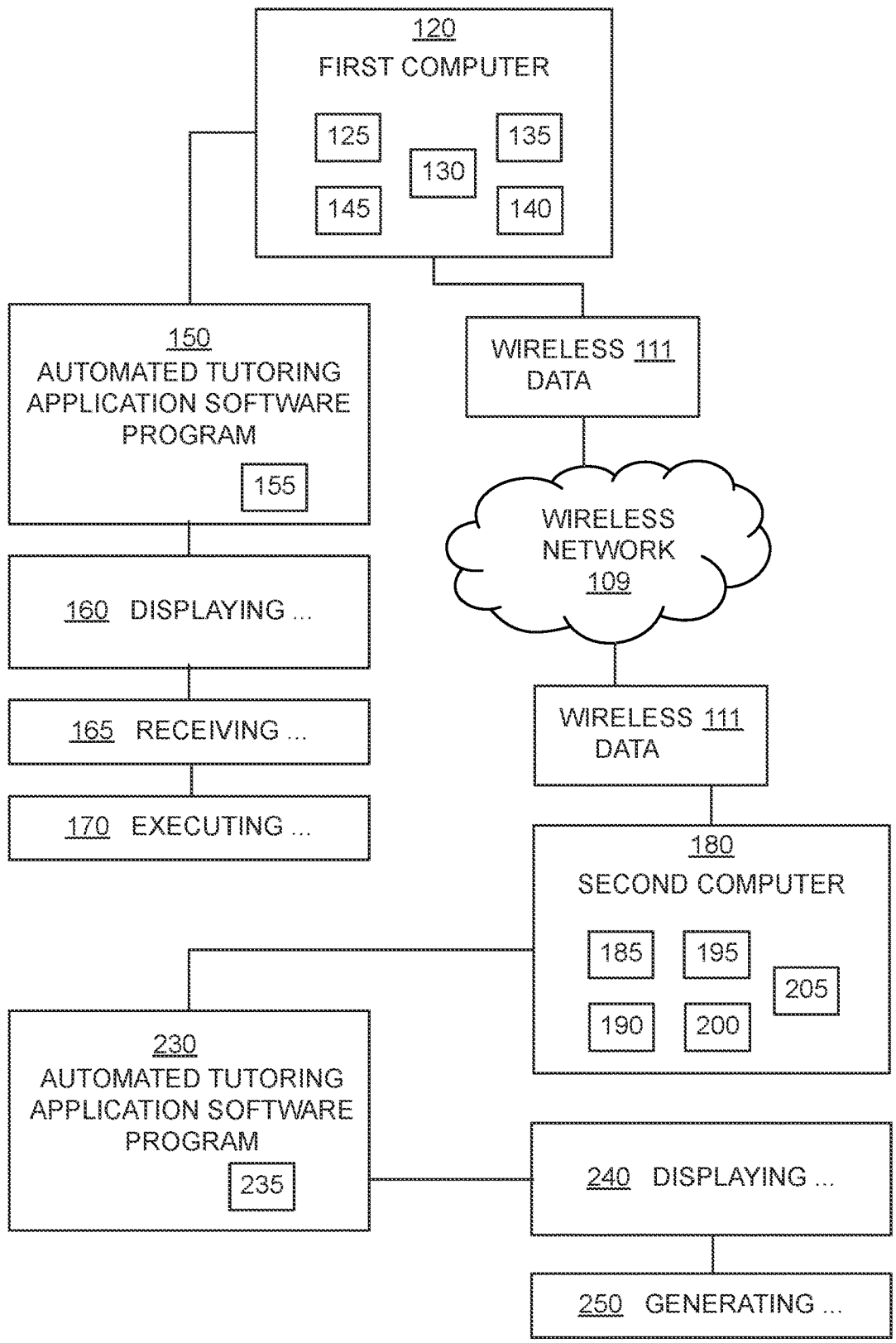
FIG. 3 is a diagram of an embodiment of an automated tutoring system (100) according to the inventive concepts disclosed herein.

Referring now to FIG. 3, shown therein is an embodiment of an automated tutoring system (100) in accordance with the inventive concepts disclosed herein. The automated tutoring system (100) including: a first computer (120) having a display screen (125), a video camera (130), one or more processors (135), one or more transceivers (140) for transmitting and receiving wireless data (111) and one or more data storage devices (145). The automated tutoring system (100) also having an automated tutoring application software program (150) running on the first computer (120). The automated tutoring application software program (150) including automated application program instructions (155) for: displaying (160) a list of pre-approved tutors based on subject matter expertise, location and real-time availability: receiving (165) a user selection of a pre-approved tutor from the list of pre-approved tutors based on subject matter expertise, location and real-time availability; and executing (170) a tutoring transaction for the purchase of one or more tutoring sessions from the selected one or more pre-approved tutors at a specified date and time. The automated tutoring application software program (150) also including a second computer (180) connected to the first computer (120) through a wireless network (109). The second computer (180) having a display screen (185), a video camera (190), one or more processors (195), one or more transceivers (200) for transmitting and receiving wireless data (111) and one or more data storage devices (205). The automated tutoring system (100) also including an automated tutoring application software program (230) running on the second computer (180). The automated tutoring application software program (230) including automated application program instructions (235) for: displaying (240) an indication that a user of the first computer has purchased one or more tutoring sessions at a specified date and time; and generating (250) an internet link for connecting to a video conference tutoring session at the specified date and time.

The first computer (120) includes a display screen (125), a video camera (130), one or more processors (135), one or more transceivers (140) for transmitting and receiving wireless data (111) and one or more data storage devices (145). The first computer (120) is a computer which may be housed or contained in any type of device or devices. For example, a stand-alone desktop computer, mobile smart phone, tablet, laptop, or similar device for storing, sending, receiving and processing wireless data, according to instructions given to it by a computer program. Processors, transceivers, and data storage devices used in computers, such as desktop computers, laptops, mobile smart phones, tablets and the like are well known to persons of ordinary skill in the art and will not be described in further detail herein for purposes of brevity.

The automated tutoring system (100) includes automated tutoring application software program (150) running on the first computer (120). The automated tutoring application software program (150) includes automated application program instructions (155) for: displaying (160) a list of pre-approved tutors based on subject matter expertise, location and real-time availability; receiving (165) a user selection of a pre-approved tutor from the list of pre-approved tutors based on subject matter expertise, location and real-time availability; and executing (170) a tutoring transaction for the purchase of one or more tutoring sessions from the selected one or more pre-approved tutors at a specified date and time.

Computer program code for carrying out operations for aspects of the automated tutoring system (100) may be written in any combination of one or more programming languages such as Java, Smalltalk, C++ or the like and conventional procedural programming languages such as the "C" programming language or similar programming languages. The program code may execute entirely on the first computer (120), or partly on the first computer (120) and partly on another remote computer, server, mobile smart phone application, or tablet for example.

In some embodiments, remote computers may be connected to the first computer (120) or second computer (180) through any type of network, public or private, cellular or the like and including a local area network (LAN) or a wide area network (WAN), or connection may be made to an external computer, such as through the internet on the world wide web using an internet service provider. The internet is a global computer network providing a variety of information and communications facilities, consisting of interconnected networks using standardized communications protocols, for example.

The computer program instructions may be provided to a processor of a computer, mobile smart phone, tablet, mobile computing device, general purpose computer, special purpose computer, or other programmable data processing apparatus to produce a machine and system, such that the instructions, which execute via the processor, the computer, mobile smart phone, tablet, or other mobile device create a means for implementing the functions and acts described herein. The computer program instructions may also be stored in a computer readable medium that can direct a computer, mobile computing device or other programmable data processing apparatus to function in a particular manner such that the instructions stored in the computer readable medium produce an article of manufacture including instructions which implement the functions and acts specified herein.

The computer program instructions may also be loaded directly onto a computer, mobile smart phone, mobile computing device, tablet or other programmable data processing apparatus to cause a series of operational steps to be performed on the computer, mobile smart phone, mobile computing device, tablet or other programmable data processing apparatus for implementing the functions or acts specified herein.

Data may be stored on the first computer (120), second computer (180), or on one or more remote computers, mobile smart phone devices, servers or other programmable data processing apparatuses. A computer readable storage medium may be, for example, an electronic, magnetic, optical, electromagnetic, infrared, or semiconductor system, apparatus or device or any suitable combination of the foregoing. An example of a computer readable storage medium includes an electrical connection having one or more wires, a portable computer diskette, hard disk, random access memory (RAM), erasable programmable read-only memory (EPROM), flash memory, CD-ROM, optical storage devices, magnetic storage devices, the like and any combination of the foregoing. By way of example, a computer readable storage medium is any medium or device that may contain or store a program for use by or in connection with an instruction execution system, apparatus or device.

Likewise, data may be stored in the cloud or on one or more remote computers or servers or an interconnected network of computers or servers, for example.

The second computer (180) is shown as connected to the first computer (120) through a wireless network (109). The second computer (180) includes a display screen (185), a video camera (190), one or more processors (195), one or more transceivers (200) for transmitting and receiving wireless data (111) and one or more data storage devices (205). The second computer (180) is a computer which may be housed or contained in any type of device or devices. The second computer (180) may be the same or a different computer from the first computer (120) for example. The second computer (180) may be, for example, a stand-alone desktop computer, mobile smart phone, tablet, laptop, or similar device for storing, sending, receiving and processing wireless data, according to instructions given to it by a computer program. Processors, transceivers, and data storage devices used in computers, such as desktop computers, laptops, mobile smart phones, tablets and the like are well known to persons of ordinary skill in the art and will not be described in further detail herein for purposes of brevity.

The automated tutoring application software program (230) is shown running on the second computer (180). The automated tutoring application software program (230) includes automated application program instructions (235) for: displaying (240) an indication that a user of the first computer has purchased one or more tutoring sessions at a specified date and time; and generating (250) an internet link for connecting to a video conference tutoring session at the specified date and time.

Computer program code for carrying out operations for aspects of the automated tutoring system (100) may be written in any combination of one or more programming languages such as Java, Smalltalk, C++ or the like and conventional procedural programming languages such as the "C" programming language or similar programming languages. The program code may execute entirely on the second computer (180), or partly on the second computer (180) and partly on another remote computer, server, mobile smart phone application, or tablet for example.

In an embodiment, the first computer (120) or second computer (180) may be connected through any type of network, public or private, cellular or the like and including a local area network (LAN) or a wide area network (WAN), or connection may be made to an external computer, such as through the internet on the world wide web using an internet service provider. The internet is a global computer network providing a variety of information and communications facilities, consisting of interconnected networks using standardized communications protocols, for example.

The computer program instructions may be provided to a processor of a computer, mobile smart phone, tablet, mobile computing device, general purpose computer, special purpose computer, or other programmable data processing apparatus to produce a machine and system, such that the instructions, which execute via the processor, the computer, mobile smart phone, tablet, or other mobile device create a means for implementing the functions and acts described herein. The computer program instructions may also be stored in a computer readable medium that can direct a computer, mobile computing device or other programmable data processing apparatus to function in a particular manner such that the instructions stored in the computer readable medium produce an article of manufacture including instructions which implement the functions and acts specified herein.

The computer program instructions may also be loaded directly onto a computer, mobile smart phone, mobile computing device, tablet or other programmable data processing apparatus to cause a series of operational steps to be performed on the computer, mobile smart phone, mobile computing device, tablet or other programmable data processing apparatus for implementing the functions or acts specified herein.

Data may be stored on the second computer (180), first computer (120), or on one or more remote computers, mobile smart phone devices, servers or other programmable data processing apparatuses. A computer readable storage medium may be, for example, an electronic, magnetic, optical, electromagnetic, infrared, or semiconductor system, apparatus or device or any suitable combination of the foregoing. An example of a computer readable storage medium includes an electrical connection having one or more wires, a portable computer diskette, hard disk, random access memory (RAM), erasable programmable read-only memory (EPROM), flash memory, CD-ROM, optical storage devices, magnetic storage devices, the like and any combination of the foregoing. By way of example, a computer readable storage medium is any medium or device that may contain or store a program for use by or in connection with an instruction execution system, apparatus or device. Likewise, data may be stored in the cloud or on one or more remote computers or servers or an interconnected network of computers or servers, for example.

In use and by way of example, a user of an embodiment of the automated tutoring system (100) may find and contact, in real time, other students or persons with subject matter expertise in a particular area to directly connect with such persons to purchase and obtain tutoring services through the automated tutoring system (100). The automated tutoring system (100) is configured to provide an on-line or virtual marketplace or exchange where students can interact, discuss topics of interest, send and receive messages, find qualified and pre-vetted subject matter experts, students or other persons with relevant experience for a tutoring session or sessions, and bid, purchase, and receive such tutoring sessions virtually all through the automated tutoring system (100).

In some embodiments, for example, the tutoring session may be held virtually via one or more computers, including mobile devices, such as smart phones, tablets and the like, having video cameras and microphones, for example. The tutoring services may be provided by video conferencing, messaging and screen sharing functions on a mobile phone application and/or computer, website or software applications between the student and the tutor that permit the student and the tutor to simultaneously view documents and materials and communicate and to work together on real-world assignments and projects, in real time.

For example, in some embodiments, a student may search for tutors from a list of approved tutors on the improved automated tutoring platform by subject matter, availability, price, location, and various other criteria. A student may select a desired tutor, purchase, negotiate and/or bid on a tutoring session or sessions with the desired tutor, at a desired rate or at a desired date and time. Students may elect to purchase such tutoring services from a selected tutor at a specified price or bid on such tutoring services through an online auction process provided through the automated tutoring system (100) by paying a transaction fee for each bid. In the auction process, if a selected tutor is in high demand, a tutor may be able to secure a higher rate through the auction process than the tutor's standard rate. Likewise, if the tutor is not in high demand, a student may be able to secure a tutoring session at a lower rate. In this way a virtual marketplace for tutoring services is created that provides incentives for both students and tutors to provide tutoring services and receive reliable tutoring services in real-time and at fair rates.

Further, in some embodiments, for example, the student and the tutor may select and pay for one tutoring transaction or they may select and pay for multiple or recurring tutoring sessions. The rate set by a Tutor may be negotiated, increased or decreased based upon demand, market rate for such services and whether the student is purchasing multiple tutoring sessions or just one tutoring session. In this way, the tutor and student can automatically negotiate and agree upon transaction terms based upon the existing market for tutoring services available on the automated tutoring system (100).

Further, in some embodiments, for example, once a tutoring transaction has been selected and confirmed, the payment may be processed directly through the improved online automated tutoring platform, system and method. Alternatively, payment may be made through the automated tutoring system (100) through a third-party payment provider. This enables both the student and the tutor to receive real-time confirmation that a tutoring session has been selected, a price has been agreed upon, and payment has been made. After payment has been confirmed, both the student and the tutor will receive from the automated tutoring system (100) a website link or other access point or login information so that the tutoring session can be completed virtually through the automated tutoring system (100).

In some embodiments, for example, a person desiring to be listed as a tutor or a student on the automated tutoring platform, system and method must complete an application and set up a user profile via the automated tutoring system (100) to be able to receive or offer tutoring services through the automated tutoring system (100). In this way, both the student and tutor will have assurances that any person offering or receiving tutoring services via the automated tutoring system (100) has meet certain basic requirements related to safety, reliability and payment.

In some embodiments, for example, the automated tutoring system (100) may be configured to send automated reports containing information regarding a completed tutoring session to one or more email addresses or telephone phone numbers via text-message. For example, a student or parent of a student, may set up a student profile that permits the automated tutoring system (100) to automatically sends reports to the student or parent email or telephone regarding, for example, whether the tutoring session was held, the time and duration of the session and a summary of materials covered and/or subject matter areas that need attention and/or correction. The report may be automatically generated or may be selectively generated by means of a survey or test performed by the student at the beginning or end of the tutoring session which prompts the student or tutor to input certain data regarding the tutoring session. The data that is input by the student or tutor either upon setting up an initial profile or at the beginning or end of a tutoring session, may then be output into a variety of report formats for delivery to pre-selected emails or telephone numbers and at pre-selected dates and times. In this way a student or parent of a student may get automatic updates via email or text message tracking the students' progress and identifying areas in need of improvement for example. The report format may be customized during the initial set up process depending upon a variety of criteria so that the report generated is custom to each student or tutor and designed to provide only relevant information as determined by the student, tutor, or the parent of the student, for example. Similarly, the student profile and tutor profile may be set up to selectively permit reports to be generated to the tutor of the student so that the tutor can also track and record the progress a student makes and direct course material or direct the next tutoring session to more specific content focused on areas in need of improvement.

In some embodiments, for example, the automated tutoring system (100) also permits users to rate tutors, based on skill-level, price, availability and various other criteria. Such rating system may be available for students to view prior to making decisions to purchase tutoring services from a selected tutor. Such ratings and reviews are configured to help students and tutors set and negotiate rates for services and find and select tutors that will be reliable and helpful for students in a particular field of study or with a particular assignment.

In some embodiments, for example, the automated tutoring system (100) is configured to be monetized through selling advertising on the improved online automated tutoring platform. Likewise, in some embodiments, the automated tutoring system (100) may be monetized through the payment of a transaction fee or charge associated with each paid transaction or each auction bid processed through the automated tutoring system (100), for example. Likewise, in some embodiments, the automated tutoring system (100) is configured be offered to users via a subscription fee or via various other payment terms, for example.

Figure 4:
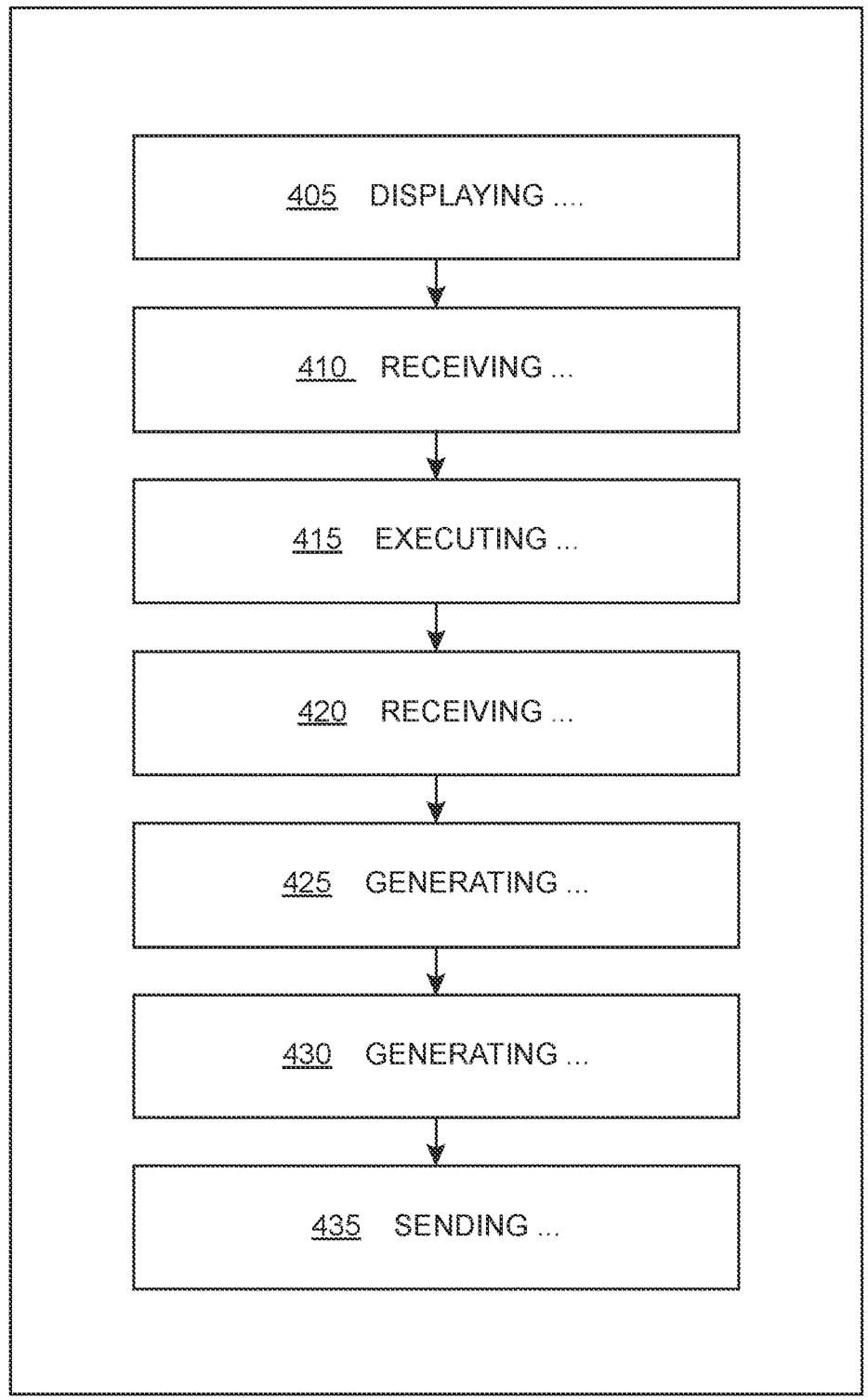
FIG. 4 is a diagram of an embodiment of an automated tutoring method (400) according to the inventive concepts disclosed herein.

Referring now to FIG. 4, shown therein is an embodiment of an automated tutoring method (400) according to the inventive concepts disclosed herein. As shown therein, the automated tutoring method (400) includes the steps of: displaying (405) a list of pre-approved tutors based on subject matter expertise, location and real-time availability; receiving (410) a user selection of a pre-approved tutor from the list of pre-approved tutors based on subject matter expertise, location and real-time availability; and executing (415) a tutoring transaction for the purchase of one or more tutoring sessions from the selected one or more pre-approved tutors at a specified date and time.

In some embodiments, the automated tutoring method (400) also includes the steps of: receiving (420) an indication that a user of the first computer has purchased one or more tutoring sessions at a specified date and time; and generating (425) an internet link for connecting to a video conference tutoring session at the specified date and time. Further, in some embodiments, the automated tutoring method (400) includes the steps of: generating (430) a tutoring report, the tutoring report based upon real-time data from one or more tutoring session and saved data; and sending (435) the generated tutoring report to one or more specified email address or telephone number.

In use and by way of example, a user of an embodiment of the automated tutoring method (400) may include steps configured to permit students to find and contact, in real time, other students or persons with subject matter expertise in a particular area, and to directly connect with such persons to purchase and obtain tutoring services through the automated tutoring method (400). The automated tutoring method (400) is configured to include steps to provide an on-line or virtual marketplace or exchange where students can interact, discuss topics of interest, send and receive messages, find qualified and pre-vetted subject matter experts, students or other persons with relevant experience for a tutoring session or sessions, and bid, purchase, and receive such tutoring sessions virtually all through the automated tutoring method (400).

In some embodiments, for example, the tutoring session may be held virtually via one or more computers, including mobile devices, such as smart phones, tablets and the like, having video cameras and microphones, for example. The tutoring services may be provided by video conferencing, messaging and screen sharing functions on a mobile phone application and/or computer, website or software applications between the student and the tutor that permit the student and the tutor to simultaneously view documents and materials and communicate and to work together on real-world assignments and projects, in real time.

For example, in some embodiments, a student may search for tutors from a list of approved tutors through the automated tutoring method (400) by subject matter, availability, price, location, and various other criteria. A student may select a desired tutor, purchase, negotiate and/or bid on a tutoring session or sessions with the desired tutor, at a desired rate or at a desired date and time. Students may elect to purchase such tutoring services from a selected tutor at a specified price or bid on such tutoring services through an online auction process provided through the automated tutoring method (400) by paying a transaction fee for each bid. In the auction process, if a selected tutor is in high demand, a tutor may be able to secure a higher rate through the auction process than the tutor's standard rate. Likewise, if the tutor is not in high demand, a student may be able to secure a tutoring session at a lower rate. In this way a virtual marketplace for tutoring services is created that provides incentives for both students and tutors to provide tutoring services and receive reliable tutoring services in real-time and at fair rates.

Further, in some embodiments, for example, the student and the tutor may select and pay for one tutoring transaction or they may select and pay for multiple or recurring tutoring sessions. The rate set by a Tutor may be negotiated, increased or decreased based upon demand, market rate for such services and whether the student is purchasing multiple tutoring sessions or just one tutoring session. In this way, the tutor and student can automatically negotiate and agree upon transaction terms based upon the existing market for tutoring services available through the automated tutoring method (400).

Further, in some embodiments, for example, once a tutoring transaction has been selected and confirmed, the payment may be processed directly through the automated tutoring method (400). Alternatively, payment may be made through the automated tutoring method (400) through a third-party payment provider. This enables both the student and the tutor to receive real-time confirmation that a tutoring session has been selected, a price has been agreed upon, and payment has been made. After payment has been confirmed, both the student and the tutor will receive through the automated tutoring method (400) a website link or other access point or login information so that the tutoring session can be completed virtually through the automated tutoring method (400).

In some embodiments, for example, a person desiring to be listed as a tutor or a student, as part of the steps of the automated tutoring method (400), must complete an application and set up a user profile via the automated tutoring method (400), to be able to receive or offer tutoring services through the automated tutoring method (400). In this way, both the student and tutor will have assurances that any person offering or receiving tutoring services via the automated tutoring method (400) has meet certain basic requirements related to safety, reliability and payment.

In some embodiments, for example, the automated tutoring method (400) may be configured to include steps to send automated reports containing information regarding a completed tutoring session to one or more email addresses or telephone phone numbers via text-message. For example, a student or parent of a student, may set up a student profile that permits the automated tutoring method (400) to include steps to automatically send reports to the student or parent email or telephone regarding, for example, whether the tutoring session was held, the time and duration of the session and a summary of materials covered and/or subject matter areas that need attention and/or correction. The report may be automatically generated or may be selectively generated by means of a survey or test performed by the student at the beginning or end of the tutoring session which prompts the student or tutor to input certain data regarding the tutoring session. The data that is input by the student or tutor either upon setting up an initial profile or at the beginning or end of a tutoring session, may then be output into a variety of report formats for delivery to pre-selected emails or telephone numbers and at pre-selected dates and times. In this way a student or parent of a student may get automatic updates via email or text message tracking the students' progress and identifying areas in need of improvement for example. The report format may be customized during the initial set up process depending upon a variety of criteria so that the report generated is custom to each student or tutor and designed to provide only relevant information as determined by the student, tutor, or the parent of the student, for example. Similarly, the student profile and tutor profile may be set up to selectively permit reports to be generated to the tutor of the student so that the tutor can also track and record the progress a student makes and direct course material or direct the next tutoring session to more specific content focused on areas in need of improvement.

In some embodiments, for example, the automated tutoring method (400) also includes steps to permit users to rate tutors, based on skill-level, price, availability and various other criteria. Such rating system may be available for students to view prior to making decisions to purchase tutoring services from a selected tutor. Such ratings and reviews are configured to help students and tutors set and negotiate rates for services and find and select tutors that will be reliable and helpful for students in a particular field of study or with a particular assignment.

In some embodiments, for example, the automated tutoring method (400) is configured to include steps to monetize the automated tutoring method (400) through selling advertising through the automated tutoring method (400). Likewise, in some embodiments, the automated tutoring method (400) may include steps to monetize, through the payment of a transaction fee or charge associated with each paid transaction or each auction bid processed through the automated tutoring method (400), for example. Likewise, in some embodiments, the automated tutoring method (400) is configured to include steps to be offered to users via a subscription fee or via various other payment terms, for example.

Figure 5:
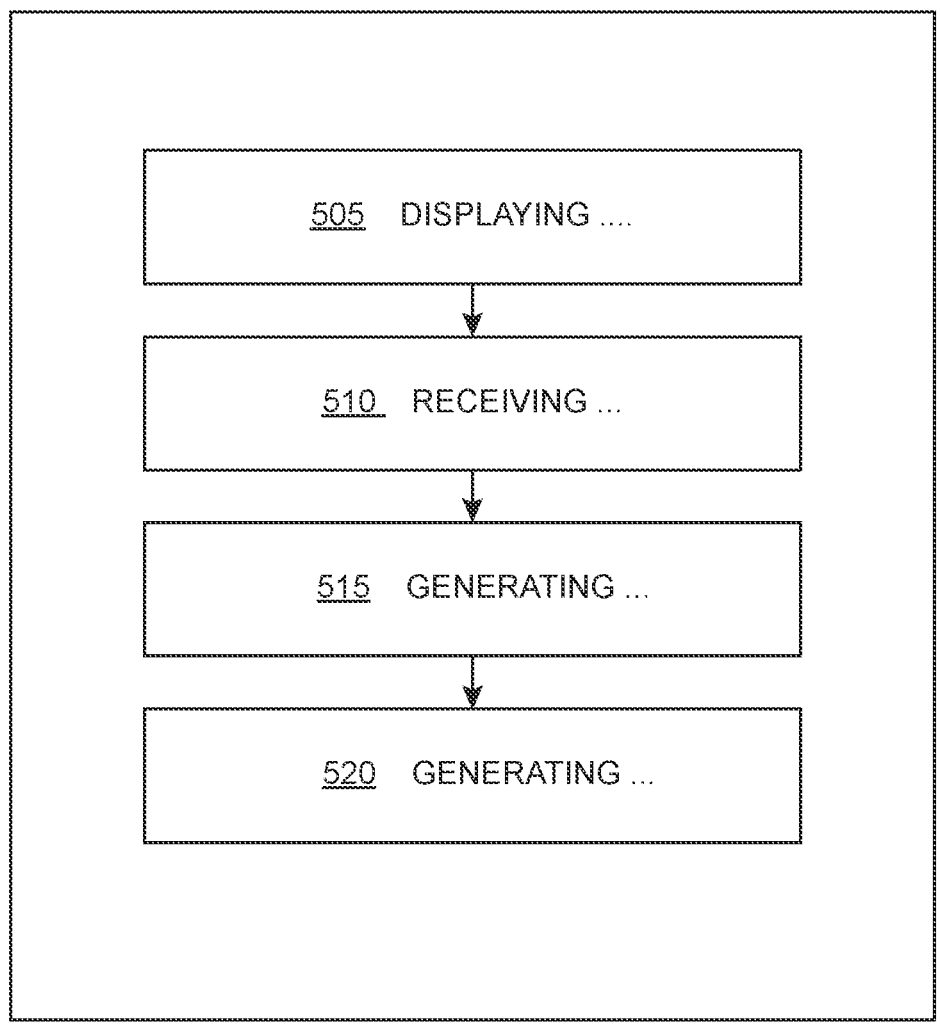
FIG. 5 is a diagram of an embodiment of an automated method of purchasing (500) tutoring services according to the inventive concepts disclosed herein.

Referring now to FIG. 5, shown therein is an embodiment of an automated method of purchasing (500) tutoring services according to the inventive concepts disclosed herein. As shown therein, the automated method for purchasing (500) tutoring services in a computer includes the steps of: displaying (505) a list of pre-approved tutors based on subject matter expertise, location and real-time availability; receiving (510) auction listing data associated with a selected pre-approved tutor; generating (515) an online auction to purchase or bid on the selected pre-approved tutor at the selected date and time; and generating (520) a confirmation receipt that a user has purchased the selected pre-approved tutor at the selected date through the online auction.

In use and by way of example, a user of an embodiment of the automated method of purchasing (500) tutoring services may include steps configured to permit students to find and contact, in real time, other students or persons with subject matter expertise in a particular area, and to directly connect with such persons to purchase and obtain tutoring services through the automated method of purchasing (500) tutoring services. The automated method of purchasing (500) tutoring services is configured to include steps to provide an on-line or virtual marketplace or exchange where students can interact, discuss topics of interest, send and receive messages, find qualified and pre-vetted subject matter experts, students or other persons with relevant experience for a tutoring session or sessions, and bid, purchase, and receive such tutoring sessions virtually all through the automated method of purchasing (500) tutoring services.

In some embodiments, for example, the tutoring session may be held virtually via one or more computers, including mobile devices, such as smart phones, tablets and the like, having video cameras and microphones, for example. The tutoring services may be provided by video conferencing, messaging and screen sharing functions on a mobile phone application and/or computer, website or software applications between the student and the tutor that permit the student and the tutor to simultaneously view documents and materials and communicate and to work together on real-world assignments and projects, in real time.

For example, in some embodiments, a student may search for tutors from a list of approved tutors provided by steps of the automated method of purchasing (500) tutoring services by subject matter, availability, price, location, and various other criteria. A student may select a desired tutor, purchase, negotiate and/or bid on a tutoring session or sessions with the desired tutor, at a desired rate or at a desired date and time. Students may elect to purchase such tutoring services from a selected tutor at a specified price or bid on such tutoring services through an online auction process provided through the automated method of purchasing (500) tutoring services by paying a transaction fee for each bid. In the auction process, if a selected tutor is in high demand, a tutor may be able to secure a higher rate through the auction process than the tutor's standard rate. Likewise, if the tutor is not in high demand, a student may be able to secure a tutoring session at a lower rate. In this way a virtual marketplace for tutoring services is created that provides incentives for both students and tutors to provide tutoring services and receive reliable tutoring services in real-time and at fair rates.

Further, in some embodiments, for example, the student and the tutor may select and pay for one tutoring transaction or they may select and pay for multiple or recurring tutoring sessions. The rate set by a Tutor may be negotiated, increased or decreased based upon demand, market rate for such services and whether the student is purchasing multiple tutoring sessions or just one tutoring session. In this way, the tutor and student can automatically negotiate and agree upon transaction terms based upon the existing market for tutoring services available through the steps of the automated method of purchasing (500) tutoring services.

Further, in some embodiments, for example, once a tutoring transaction has been selected and confirmed, the payment may be processed directly through the automated method of purchasing (500) tutoring services. Alternatively, payment may be made through the steps of the automated method of purchasing (500) tutoring services through a third-party payment provider. This enables both the student and the tutor to receive real-time confirmation that a tutoring session has been selected, a price has been agreed upon, and payment has been made. After payment has been confirmed, both the student and the tutor will receive from the steps of the automated method of purchasing (500) tutoring services a website link or other access point or login information so that the tutoring session can be completed virtually through the steps of the automated method of purchasing (500) tutoring services.

In some embodiments, for example, a person desiring to be listed as a tutor or a student through the automated method of purchasing (500) tutoring services must complete an application and set up a user profile via the steps of the automated method of purchasing (500) tutoring services to be able to receive or offer tutoring services through the steps of the automated method of purchasing (500) tutoring services. In this way, both the student and tutor will have assurances that any person offering or receiving tutoring services via the steps of the automated method of purchasing (500) tutoring services has meet certain basic requirements related to safety, reliability and payment.

In some embodiments, for example, the automated method of purchasing (500) tutoring services may be configured to include steps to send automated reports containing information regarding a completed tutoring session to one or more email addresses or telephone phone numbers via text-message. For example, a student or parent of a student, may set up a student profile that permits the automated method of purchasing (500) tutoring services to include steps to automatically send reports to the student or parent email or telephone regarding, for example, whether the tutoring session was held, the time and duration of the session and a summary of materials covered and/or subject matter areas that need attention and/or correction. The report may be automatically generated or may be selectively generated by means of a survey or test performed by the student at the beginning or end of the tutoring session which prompts the student or tutor to input certain data regarding the tutoring session. The data that is input by the student or tutor either upon setting up an initial profile or at the beginning or end of a tutoring session, may then be output into a variety of report formats for delivery to pre-selected emails or telephone numbers and at pre-selected dates and times. In this way a student or parent of a student may get automatic updates via email or text message tracking the students' progress and identifying areas in need of improvement for example. The report format may be customized during the initial set up process depending upon a variety of criteria so that the report generated is custom to each student or tutor and designed to provide only relevant information as determined by the student, tutor, or the parent of the student, for example. Similarly, the student profile and tutor profile may be set up to selectively permit reports to be generated to the tutor of the student so that the tutor can also track and record the progress a student makes and direct course material or direct the next tutoring session to more specific content focused on areas in need of improvement.

In some embodiments, for example, the automated method of purchasing (500) tutoring services also includes steps to permit users to rate tutors, based on skill-level, price, availability and various other criteria. Such rating system may be available for students to view prior to making decisions to purchase tutoring services from a selected tutor. Such ratings and reviews are configured to help students and tutors set and negotiate rates for services and find and select tutors that will be reliable and helpful for students in a particular field of study or with a particular assignment.

In some embodiments, for example, the automated method of purchasing (500) tutoring services is configured to include steps to monetize through selling advertising through the steps of the automated method of purchasing (500) tutoring services. Likewise, in some embodiments, the automated method of purchasing (500) tutoring services may include steps to monetize through the payment of a transaction fee or charge associated with each paid transaction or each auction bid processed through the steps of the automated method of purchasing (500) tutoring services, for example. Likewise, in some embodiments, the automated method of purchasing (500) tutoring services is configured to include steps to be offered to users via a subscription fee or via various other payment terms, for example.

Figure 6:
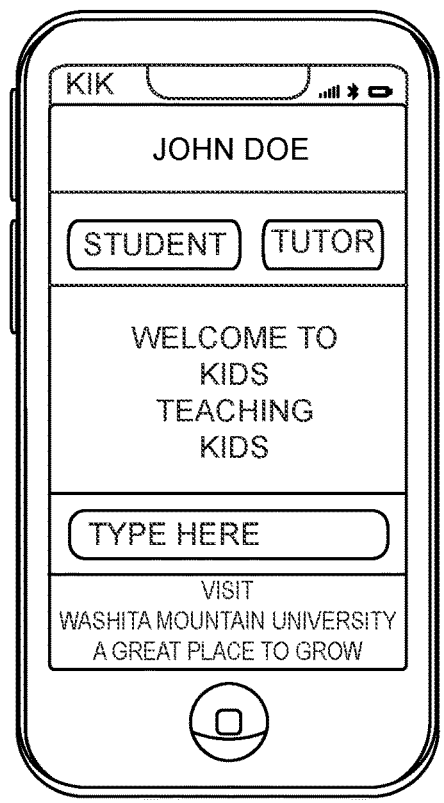
FIG. 6 is a depiction of an embodiment of a home screen for the automated tutoring application software program according to the inventive concepts disclosed herein.
Figure 7:
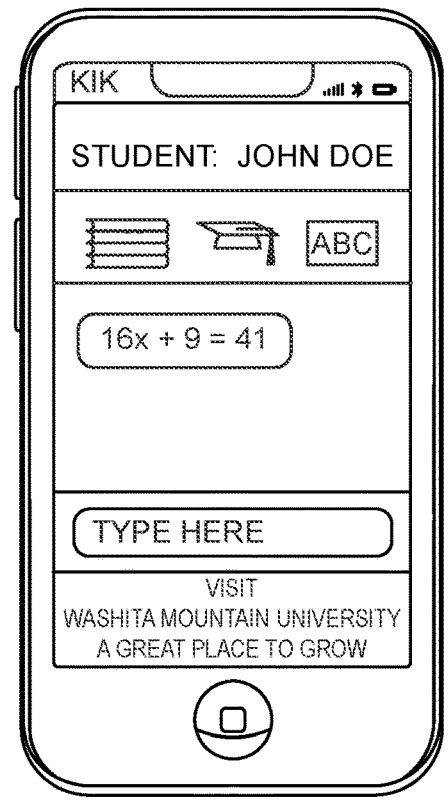
FIG. 7 is a depiction of an embodiment of a student screen for the automated tutoring application software program according to the inventive concepts disclosed herein.
Figure 8:
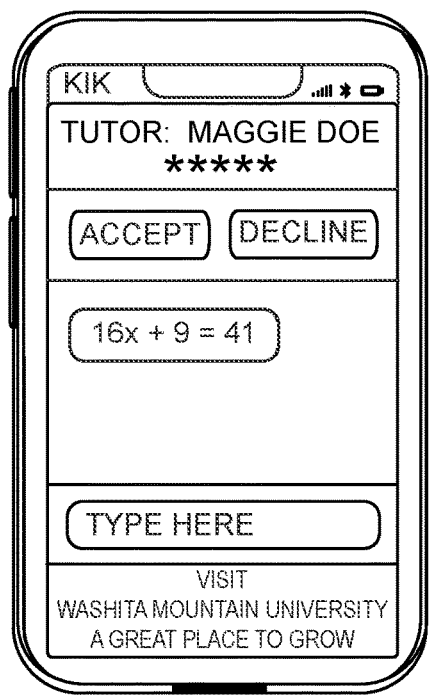
FIG. 8 is a depiction of an embodiment of a tutor screen page of the automated tutoring application software program according to the inventive concepts disclosed herein.
Figure 9:
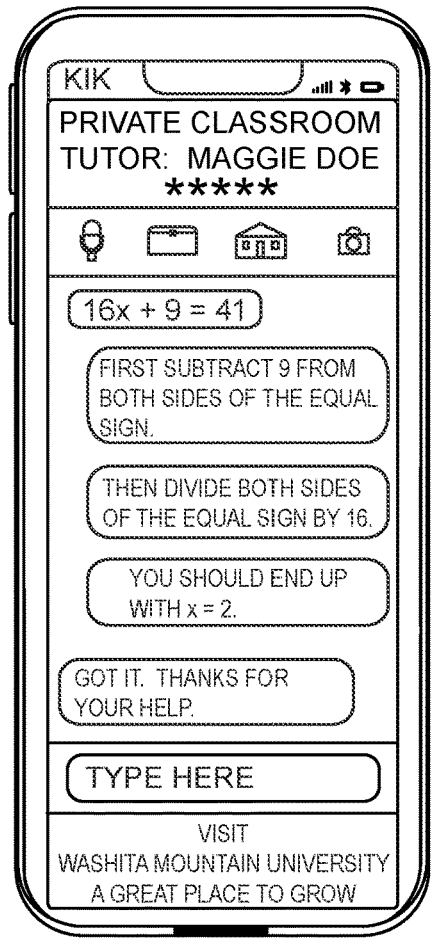
FIG. 9 is a depiction of an embodiment of a classroom screen page of the automated tutoring application software program according to the inventive concepts disclosed herein.
Figure 10:
FIG. 10 is a depiction of an embodiment of a drop-down menu, showing subject matter, on a page of the automated tutoring application software program according to the inventive concepts disclosed herein.
Figure 10:
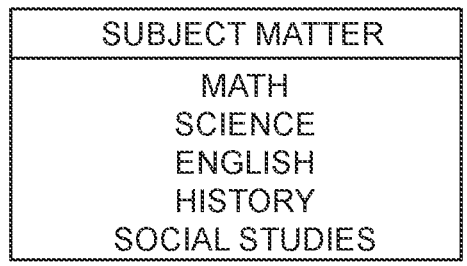
Figure 11:
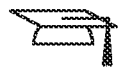
FIG. 11 is a depiction of an embodiment of a drop-down menu, showing grade level, on a page of the automated tutoring application software program according to the inventive concepts disclosed herein.
Figure 11:
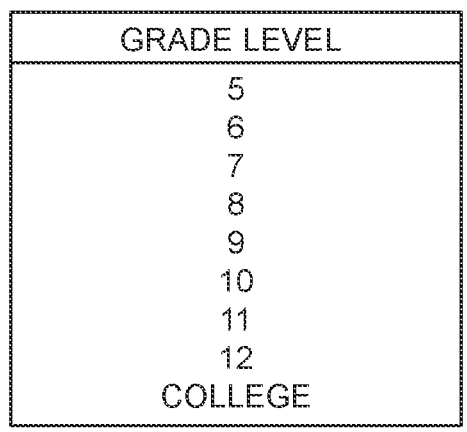
Figure 12:
FIG. 12 is a depiction of an embodiment of a drop-down menu, showing subject matters of math, on a page of the automated tutoring application software program according to the inventive concepts disclosed herein.
Figure 12:
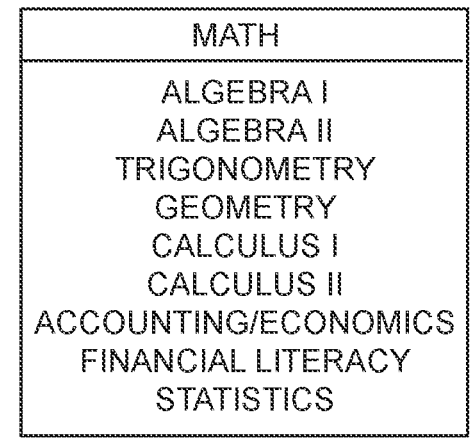
Figure 13:
FIG. 13 is a depiction of an embodiment of a drop-down menu, showing subject matters of science, on a page of the automated tutoring application software program according to the inventive concepts disclosed herein.
Figure 14:
FIG. 14 is a depiction of an embodiment of a drop-down menu, showing subject matters of English, on a page of the automated tutoring application software program according to the inventive concepts disclosed herein.
Figure 15:
FIG. 15 is a depiction of an embodiment of a drop-down menu, showing subject matters of history, on a page of the automated tutoring application software program according to the inventive concepts disclosed herein.
Figure 16:
FIG. 16 is a depiction of an embodiment of a drop-down menu, showing subject matters of social studies, on a page of the automated tutoring application software program according to the inventive concepts disclosed herein.
Figure 16:
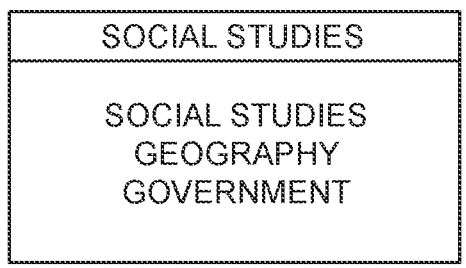
Figure 17:
FIG. 17 is a depiction of an embodiment of a drop-down menu, showing toolbox tools, on a page of the automated tutoring application software program according to the inventive concepts disclosed herein.
Figure 17:
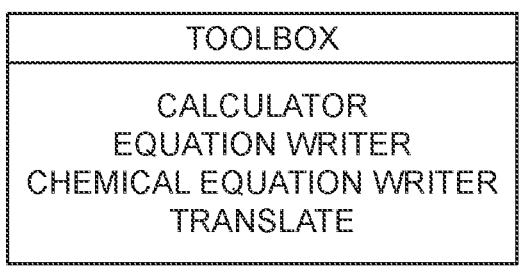
Figure 18:
FIG. 18 is a depiction of an embodiment of a drop-down menu, showing a legend for various functions and features available on a page of the automated tutoring application software program according to the inventive concepts disclosed herein.
Figure 18:
Figure 18:
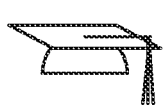
Figure 18:
Figure 18:
Figure 18:
Figure 18:

Referring now to FIGS. 6-18, shown therein are depictions of various screen pages and features, as displayed on a display screen, such as a computer monitor, tv screen, or mobile phone for example, showing functorialities of embodiments of the automated tutoring application software program described herein, including, but not limited to, the automated tutoring application software program (150) and the automated tutoring application software program (230). FIG. 6 is a depiction of an embodiment of a home screen for the automated tutoring application software program according to the inventive concepts disclosed herein. FIG. 7 is a depiction of an embodiment of a student screen for the automated tutoring application software program according to the inventive concepts disclosed herein. FIG. 8 is a depiction of an embodiment of a tutor screen page of the automated tutoring application software program according to the inventive concepts disclosed herein. FIG. 9 is a depiction of an embodiment of a classroom screen page of the automated tutoring application software program according to the inventive concepts disclosed herein. FIG. 10 is a depiction of an embodiment of a drop-down menu, showing subject matter, on a page of the automated tutoring application software program according to the inventive concepts disclosed herein. FIG. 11 is a depiction of an embodiment of a drop-down menu, showing grade level, on a page of the automated tutoring application software program according to the inventive concepts disclosed herein. FIG. 12 is a depiction of an embodiment of a drop-down menu, showing subject matters of math, on a page of the automated tutoring application software program according to the inventive concepts disclosed herein. FIG. 13 is a depiction of an embodiment of a drop-down menu, showing subject matters of science, on a page of the automated tutoring application software program according to the inventive concepts disclosed herein. FIG. 14 is a depiction of an embodiment of a drop-down menu, showing subject matters of English, on a page of the automated tutoring application software program according to the inventive concepts disclosed herein. FIG. 15 is a depiction of an embodiment of a drop-down menu, showing subject matters of history, on a page of the automated tutoring application software program according to the inventive concepts disclosed herein. FIG. 16 is a depiction of an embodiment of a drop-down menu, showing subject matters of social studies, on a page of the automated tutoring application software program according to the inventive concepts disclosed herein. FIG. 17 is a depiction of an embodiment of a drop-down menu, showing toolbox tools, on a page of the automated tutoring application software program according to the inventive concepts disclosed herein. FIG. 18 is a depiction of an embodiment of a drop-down menu, showing a legend for various functions and features available on a page of the automated tutoring application software program according to the inventive concepts disclosed herein.

As shown therein, in some embodiments, for example, a person desiring to be listed as a tutor or a student on the automated tutoring platform, system and method must complete an application and register and set up a user profile via the automated tutoring platform, system and method to be able to receive or offer tutoring services through the online automated tutoring platform, system and method. In this way, both the student and tutor will have assurances that any person offering or receiving tutoring services via the automated tutoring platform, system and method has meet certain basic requirements related to safety, reliability and payment.

For example, in some embodiments, including as shown in FIGS. 6-7 for example, the improved automated tutoring platform, system and method is configured to allow a student in need of help in a particular subject to "post" a question on a virtual "chalkboard" page of the automated tutoring software application program of the automated tutoring platform, system and method. Once a question has been posted to the virtual chalkboard, an automatic notification may be sent out to all registered tutors who have expertise in that subject matter. As shown in FIGS. 8-9, for example, a tutor may then view the post and decide if the tutor is able and willing to help. If the tutor believes that he or she can help the student, the tutor may "accept" the notification. Once accepted, the improved automated tutoring platform, system and method directs the tutor and student to enter a virtual and private "classroom" (as shown in FIG. 9), which may be a private chat room for one student and one tutor, or a group of students or tutors, to interact directly, via messaging, video, chat, exchanging of pictures and to work through the particular posted problem virtually and in real time through the automated tutoring platform, system and method.

In some embodiments, for example, a person may set up a profile as a student, tutor, or both. A user of the automated tutoring platform, system and method may be required to list and identify the subject matters of interest or such subject matters that they have expertise, skill, or knowledge. For example, as shown in FIGS. 10-16, a tutor may select from a menu of subject matter areas they wish to provide tutoring services without limiting the number of subject matter areas. In some embodiments, the tutor or student username is publicly shared, while in other embodiments the student or tutor username may be private or only selectively shared or publicly available. In some embodiments, the student and tutor profile may remain confidential and not shared, while in other embodiments the student or tutor profile may be shared or publicly available or portions of the student or tutor profile may be selectively shared or publicly available. When a student "posts" a question to a "chalkboard" via the improved automated tutoring platform, system and method, the student may select from a list of subjects that their posted question pertains to. For example, math, English, history, and the like. Persons who have registered and set up a profile as a tutor for that subject matter will then be able to receive one or more notifications that a question has been posted in that subject area. The tutor will then be able to view the question posted and determine if they have the ability and time to help the student with the posted question. A tutor, through the improved automated tutoring platform, system and method may establish a schedule when they are available to receive such notifications. For example, a tutor may select to receive posting notifications automatically, 24 hours a day, or during a select time frame, for example from 5 pm until 9 pm Monday through Friday. A tutor may also select to not receive notifications of postings during a select date and time range or at recurring times over a select date and time range, by selecting an "unavailable" button for a desired time or time frame or date or date range.

In some embodiments, for example, a student may search for tutors from a list of approved tutors on the improved automated tutoring platform by subject matter, availability, location, and various other criteria. There are no limits as to the location and availability of either the student or tutor. For example, a student located in Oklahoma USA may receive tutoring services from a tutor located in California USA or a tutor located in Paris France, for example. As shown in FIG. 17, for example, in some embodiments, the improved automated tutoring platform, system and method may also include a translation feature or button that permits students and tutors, who speak different languages to interact and translate text, voice and other communications in real-time through the improved automated tutoring platform, system and method. Information provided by a user during the initial registration and profile set up process, such as geographic location (either as stated in the registration application or profile, or via real-time GPS coordinates form a computer such as a mobile smart phone), language spoken, and various other criteria may be prioritized when sending out notifications to tutors. For example, an initial geographic range near the student may be selected so that a posting may be first sent out only to tutors within that initial geographic range near the student. Likewise, after a short period of time, if the posting is not accepted by a tutor, the posting range may then be automatically sent out to a second geographic range that includes locations further from the location of the student, for example. In this way, tutors that are in closer in proximity to the student may be selected to be notified first of postings. For example, a geographic range of tutors available in a particular city, then state, then geographic region, then country, then worldwide, for example.

In some embodiments, for example, when a student posts a question or problem to the chalkboard, the student will open the application and select the "post" icon, select the subject matter, from a drop-down menu, then select the grade level equivalent of the subject, type their question, or take a picture of the question from their book or worksheet, or copy and paste the question from an online source and then post the question. Then, the automated tutoring application, using the information provided by the student as to the subject matter and grade level, will send a notification to the tutors who have registered for that subject matter and grade level. As shown in FIGS. 6-9, for example, once a tutor has viewed the posting and accepted the notification, the student and tutor will be connected in real-time to one another in a private virtual chat room called a "classroom." Once inside of the virtual classroom, the student and tutor may have a variety of tools available for use from a drop-down. As shown in FIG. 17-18, for example, the tools will include, but not be limited to, such applications as a calculator, translator, equation writer and various other tools and links to help facilitate communication and problem solving in real-time via the automated tutoring platform, system and method. The application may keep track of the time involved in a tutoring session via a "timesheet" or have an automatic time recording application, configured to automatically record and track the length of time the student and tutor are in the virtual classroom. The time recording application, may be configured to keep a record of the running total time the tutor has been helping the student and may be stopped and started, for example, by the tutor depending upon the nature of the tutoring session and intended use of the timer.

It should be understood that embodiments of the inventive concepts disclosed herein may be offered, shipped or sold separately or together via one or more websites, as a system, a software program, or programs, or pre-loaded on various computers or mobile devices, hard drives, such as CD-ROM's, thumb-drives and the like for example.

From the above description, it is clear that the inventive concepts disclosed herein are adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the broad scope of the inventive concepts disclosed herein and defined by the appended claims.

What is claimed is:

1. An automated open wireless network tutoring system comprising:
    a first computer connected to an open wireless network, the first computer comprising a display screen, a video camera, one or more processors, one or more transceivers for transmitting and receiving wireless data and one or more data storage devices;
    an automated open wireless network tutoring application software program running on the first computer, the automated open wireless network tutoring application software program comprising automated application program instructions for:
    receiving a tutoring query for a tutor from a user;
    displaying a posted tutoring query from the user;
        sending one or more automatic notification to one or more computer associated with one or more pre-approved tutor containing information about the posted tutoring query;
        receiving a notification from a computer associated with a pre-approved tutor that a pre-approved tutor has accepted the notification; and
    generating a private virtual classroom for real-time communication between the computer associated with the pre-approved tutor that accepted the notification and the computer associated with the user;
    a second computer connected to the first computer through the open wireless network, the second computer comprising a display screen, a video camera, one or more processors, one or more transceivers for transmitting and receiving wireless data and one or more data storage devices;
    an automated open wireless network tutoring application software program running on the second computer, the automated tutoring application software program comprising automated application program instructions for:
    receiving a tutoring query for a tutor from a user;
    displaying the posted tutoring query for a tutor from the user;
        sending one or more automatic notification to one or more computer associated with one or more pre-approved tutor containing information about the posted tutoring query;

receiving a notification from a computer associated with a pre-approved tutor that a pre-approved tutor has accepted the notification;

scheduling one or more tutoring session; and generating a private virtual classroom tutoring session, the private virtual classroom for real-time communication between the computer associated with the pre-approved tutor that accepted the notification and the computer associated with the user.

2. The automated open wireless network tutoring system of claim 1 wherein the private virtual classroom generated by the automated tutoring application software further comprises a suite of interactive tools configured to permit the user and tutor to virtually communicate and interact in the private virtual classroom in real time using audio, video, screen-share, touch screen, chat, calculator, and language translation tools.

3. The automated open wireless network tutoring system of claim 1 wherein the automated tutoring application software program further comprises automated application instructions for: generating and displaying a virtual chalkboard for posting and responding to one or more tutoring query, the virtual chalkboard visible to a pre-selected set of users of the automated tutoring system that are selected based upon geographic location, subject matter, and experience.

4. The automated open wireless network tutoring system of claim 1 wherein the automated tutoring application software program further comprises automated application instructions for:

displaying a virtual marketplace using the automated open wireless network tutoring software application program, the virtual marketplace for real time bidding, negotiating and purchasing of tutoring services offered by a user of the automated open wireless network tutoring software application program;

receiving a price offer from a tutor for providing tutoring services to be completed in the virtual classroom of the automated open wireless network tutoring software application program;

receiving a price bid from a user for receiving tutoring services to be completed in the virtual classroom of the automated open wireless network tutoring software application program; and completing a payment transaction between the tutor and the user, based upon the price offer and the price bid received for the private virtual classroom tutoring session using the automated open wireless network tutoring software application program.

5. The automated open wireless network tutoring system of claim 1 wherein the automated tutoring application software program further comprises automated application instructions for: displaying paid advertisements on the virtual chalkboard.

6. The automated open wireless network tutoring system of claim 1 wherein the automated tutoring application software program further comprises automated application instructions for: rating tutors based on experience, price, and performance.

7. The automated open wireless network tutoring system of claim 1 wherein the automated tutoring application software program further comprises automated application instructions for: notifying tutors of a tutoring query based on geographic location of the tutor.

8. An automated open wireless network tutoring method in a computer comprising the steps of:

receiving a tutoring query for a tutor from a user of an automated open wireless network tutoring software application program connected to an open wireless network;

displaying a the posted tutoring query from the user on a virtual chalkboard of the automated open wireless network tutoring software application program, the virtual chalkboard visible to one or more pre-approved tutor of the automated tutoring software application program connected to the open wireless network;

sending one or more automatic notification using the automated open wireless network software application program connected to the open wireless network to one or more computer associated with one or more pre-approved tutor containing information about the posted tutoring query;

receiving a notification using the automated open wireless network software application program connected to the open wireless network from a computer associated with a pre-approved tutor that a pre-approved tutor has accepted the notification;

scheduling one or more tutoring session using the automated open wireless network tutoring software application program connected to the open wireless network between two or more computers associated with at least one student and one pre-approved tutor using a calendar system of the automated tutoring software application program; and generating a private virtual classroom for the tutoring session using the automated open wireless network tutoring software application program, the private virtual classroom configured for real-time communication between the computer associated with the pre-approved tutor that accepted the notification and the computer associated with the user.

9. The automated open wireless network tutoring method of claim 8 further comprising the steps of:

generating a tutoring report using the automated open wireless network tutoring software application program, the tutoring report based upon real-time data from the one or more tutoring session and saved data; and sending the generated tutoring report using the automated open wireless network tutoring software application program to one or more specified email address or telephone number.

10. The automated open wireless network tutoring method in a computer of claim 8 wherein the generated private virtual classroom further comprises a suite of interactive tools configured to permit the user and tutor to virtually communicate and interact in the private virtual classroom in real time using audio, video, screen-share, touch screen, chat, calculator, and language translation tools.

11. The automated open wireless network tutoring method in a computer of claim 8 further comprising the step of:

displaying a virtual marketplace using the automated open wireless network tutoring software application program, the virtual marketplace for real time bidding, negotiating and purchasing of tutoring services offered by users of the automated open wireless network tutoring software application program;

receiving a price offer from a tutor for providing tutoring services to be completed in the virtual classroom of the automated open wireless network tutoring software application program;

receiving a price bid from a student for receiving tutoring services to be completed in the virtual classroom of the automated open wireless network tutoring software application program; and completing a payment transaction between the tutor and the user, based upon the price offer and the price bid received for the private virtual classroom tutoring session using the automated open wireless network tutoring software application program.

12. The automated open wireless network tutoring method in a computer of claim 8 further comprising the step of: displaying paid advertisements on virtual chalkboard.

13. The automated open wireless network tutoring method in a computer of claim 8 further comprising the step of: rating tutors based on experience, price, and performance using the automated open wireless network tutoring software application program.

14. The automated open wireless network tutoring method in a computer of claim 8 further comprising the step of: notifying tutors of a tutoring query based on geographic location of the tutor using the automated open wireless network tutoring software application program.

* * * * *